United States Patent
Larsson et al.

(10) Patent No.: US 10,687,223 B2
(45) Date of Patent: Jun. 16, 2020

(54) FIRST COMMUNICATION DEVICE, SECOND COMMUNICATION DEVICE AND METHODS PERFORMED THEREBY FOR MANAGING A WIRELESS SERVICE

(71) Applicant: Telefonaktiebolaget LM Ericsson (publ), Stockholm (SE)

(72) Inventors: Kjell Larsson, Luleå (SE); Peter Ökvist, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/475,968

(22) PCT Filed: Jan. 16, 2017

(86) PCT No.: PCT/SE2017/050035
§ 371 (c)(1),
(2) Date: Jul. 3, 2019

(87) PCT Pub. No.: WO2018/132045
PCT Pub. Date: Jul. 19, 2018

(65) Prior Publication Data
US 2019/0357060 A1 Nov. 21, 2019

(51) Int. Cl.
*H04W 16/28* (2009.01)
*H04W 4/02* (2018.01)
*H04W 72/08* (2009.01)

(52) U.S. Cl.
CPC .......... *H04W 16/28* (2013.01); *H04W 4/023* (2013.01); *H04W 72/085* (2013.01)

(58) Field of Classification Search
CPC ... H04W 16/28; H04W 4/023; H04W 72/085; H04W 4/02; H04W 4/00; H04W 8/00;
(Continued)

(56) References Cited

U.S. PATENT DOCUMENTS

2010/0295676 A1 11/2010 Khachaturov et al.
2012/0252418 A1* 10/2012 Kandekar ............. H04W 4/021
455/414.1
(Continued)

OTHER PUBLICATIONS

International Search Report and Written Opinion dated Jul. 18, 2017 for International Application No. PCT/SE2017/050035 filed on Jan. 16, 2017, consisting of 11-pages.

*Primary Examiner* — Chuong A Ngo
(74) *Attorney, Agent, or Firm* — Patent Portfolio Builders, PLLC

(57) ABSTRACT

A method performed by a first communication device operating in a wireless communications network is described herein. The first communication device receives, via an interface of the first communication device, a first indication from a user of the first communication device. The first indication explicitly indicates a desired location to receive a wireless service. The first communication device provides, based on the received first indication, a second indication to a second communication device operating in the wireless communications network. The second indication indicates that a space corresponding to the indicated desired location, is a desired space to receive the wireless service from the wireless communications network. The first communication device also initiates obtaining the wireless service from the second communication device whenever the first communication device is located in the space.

30 Claims, 7 Drawing Sheets

(58) Field of Classification Search
CPC ..... H04W 76/02; H04W 4/008; H04W 8/005;
H04W 76/023; H04L 29/08; H04L 67/16;
H04L 67/26; H04L 67/18; H04B 7/06;
H04B 7/0617
See application file for complete search history.

(56) References Cited

U.S. PATENT DOCUMENTS

2013/0159463 A1     6/2013   Bentley et al.
2018/0351624 A1* 12/2018   Hakola ................ H04B 7/0617

* cited by examiner

FIRST COMMUNICATION DEVICE, SECOND COMMUNICATION DEVICE AND METHODS PERFORMED THEREBY FOR MANAGING A WIRELESS SERVICE

CROSS-REFERENCE TO RELATED APPLICATIONS

This application is a Submission Under 35 U.S.C. § 371 for U.S. National Stage Patent Application of International Application Number: PCT/SE2017/050035, filed Jan. 16, 2017 entitled "FIRST COMMUNICATION DEVICE, SECOND COMMUNICATION DEVICE, AND METHODS PERFORMED THEREBY FOR MANAGING A WIRELESS SERVICE," the entirety of which is incorporated herein by reference.

TECHNICAL FIELD

The present disclosure relates generally to a first communication device and methods performed thereby for managing a wireless service. The present disclosure also relates generally to the second communication device and methods performed thereby for managing the wireless service. The present disclosure further relates generally to a computer program product, comprising instructions to carry out the actions described herein, as performed by the first communication device, or by the second communication device. The computer program product may be stored on a computer-readable storage medium.

BACKGROUND

Communication devices such as wireless devices are also known as e.g. User Equipments (UE), mobile terminals, wireless terminals and/or Mobile Stations (MS). Wireless devices are enabled to communicate wirelessly in a wireless communications network, sometimes also referred to as a cellular communications network, a cellular radio system, cellular system, or cellular network. The communication may be performed e.g. between two wireless devices, between a wireless device and a regular telephone and/or between a wireless device and a server via a Radio Access Network (RAN) and possibly one or more core networks, comprised within the wireless communications network.

Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by an access node such as a Base Station (BS), e.g., a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. The base stations communicate over the air interface operating on radio frequencies with the terminals within range of the base stations. In the context of this disclosure, the expression Downlink (DL) is used for the transmission path from the base station to the wireless device. The expression Uplink (UL) is used for the transmission path in the opposite direction i.e., from the wireless device to the base station.

In 3rd Generation Partnership Project (3GPP) Long Term Evolution (LTE), network nodes, which may be referred to as eNodeBs or even eNBs, may be directly connected to one or more core networks. All data transmission is in LTE controlled by the radio base station.

Multi-Antenna Techniques

Multi-antenna techniques may significantly increase the data rates and reliability of a wireless communication system. The 5th Generation (5G) technology, which is currently being developed, incorporates the use of beamforming. Beamforming may be understood as a signal processing technique which relies on combining elements in an array antenna in such a way that signals at particular angles experience constructive interference while others experience destructive interference. The beams used may typically be highly directive and provide gains of 20 decibels (dB) or more, since so many antenna elements may participate in forming a beam. An array antenna may consist of many antenna elements to achieve a large array gain. Many antenna elements may participate in forming a beam, and the beams are typically highly directive, giving beamforming gains of 20 decibels (dB) or more. Each Transmission Point (TP) may, by use of an array antenna, generate transmission of a large number of beams having different pointing direction and/or polarization. The transmission of a signal is performed over multiple antenna elements and applying individual complex weights to these antenna elements, such that the signal is basically intended for a single wireless device or terminal position. As the number of antennas increases, the energy may be focused with extreme precision into small regions in space. The result is spatial selectivity, such that beamforming may be understood as a way to transmit a signal with such narrow beams that it is intended for a single wireless device or a group of wireless devices in a similar geographical position. In 5G systems, the number of antenna elements at the transmitter and/or receiver side may be significantly increased compared to common 3G and 4G systems, as 5G systems likely will operate in higher frequencies making it feasible to place a large amount of antennas in a small physical area.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

The LTE standard is currently evolving with enhanced MIMO support. In the 5th Generation (5G) technology, which is currently being developed, massive Multiple-Input Multiple-Output (MIMO) is one of the best candidate technologies for the radio physical layer. Massive MIMO, which may also be known as large-scale antenna systems and very large MIMO, may be understood as a multi-user MIMO technology where each BS may be equipped with a large number of antenna elements, at least 50, which may be used to serve many terminals that share the same time and frequency band and are separated in the spatial domain.

With introduction of the 5G technology, gigabit over-the-air mobile systems may most likely emerge. One foreseen application of the emerging 5G access is to substitute content, e.g., TV content, distribution over wireline accesses with wireless accesses. In that context, the radio connection may be represented by a non-mobility fixed point-to-point connection. Such connections may often be manifested by some sort of Fixed Wireless Terminals (FWT). FWT may be understood as wireless devices as described above, but they are limited to an almost permanent location with almost no roaming abilities. FWT are considered being substitutions for 'Fiber To The Home' (FTTH), a.k.a. "Fiber To The Premises" (FTTP). FTTH may be understood as a form of fiber-optic communication delivery, in which an optical fiber is run in an optical distribution network from the central office all the way to living space or a home. In everyday speech, this emerging trend is often described as deployment of "wireless fiber".

In foreseen installations, preferred deployments to achieve sufficiently high end user performance may likely strive to maintain Line-of-Sight (LoS) between as many Customer-Premises Equipment (CPE) and Transmission Points (TPs) as possible. Typical mounting points of TPs may be at different kinds of poles in the area; for example light poles, utility pole sites, or re-using current, if any, macro cellular grid. CPEs are potentially either installed at roof-tops, being wall-mounted, outdoors, or user-deployed in some suitable indoor placement, i.e., behind some, preferably, TP-facing window. Other solutions described may be indoor customer-deployed CPEs.

Coverage from Individual Beams

To achieve the gigabit performance mentioned earlier, according to communications theory, many parallel information streams, i.e. many MIMO layers, may likely need to be conveyed. With said massive MIMO installations, a plethora of antennas, typically 128 antenna elements, may become common, and corresponding beam angles/widths may hence shrink. Given the narrower beam widths, and corresponding technical approaches to select proper directions of transmissions, the resulting "spatial resolution" at the receiving end may become very accurate compared to wide-beam macro installations, etc.

The 5G concept also brings a paradigm shift in that transmission points no longer may need to be mounted in a wide-area coverage sense, but basically installed at "street level", near expected users.

Existing methods to provide the gigabit performance that is expected to be required in future systems may result in capacity deficiencies, as well as increased latencies of the networks.

SUMMARY

It is an object of embodiments herein to enable the improvement of the performance of a wireless communications network. It is a particular object of embodiments herein to improve the management of a load of the wireless communications network.

According to a first aspect of embodiments herein, the object is achieved by a method performed by a first communication device operating in a wireless communications network. The first communication device receives, via an interface of the first communication device, a first indication. The first indication is from a user of the first communication device. The first indication explicitly indicates a desired location to receive a wireless service. The first communication device provides, based on the received first indication, a second indication to a second communication device operating in the wireless communications network. The second indication indicates that a space corresponding to the indicated desired location, is a desired space to receive the wireless service from the wireless communications network. The first communication device initiates obtaining the wireless service from the second communication device whenever the first communication device is located in the space.

According to a second aspect of embodiments herein, the object is achieved by a method performed by the second communication device operating in the wireless communications network. The second communication device receives the second indication from the first communication device operating in the wireless communications network. The second indication indicates that the space is the desired space to receive the wireless service from the wireless communications network. The space corresponds to the location explicitly indicated by the user of the first communication device, as the desired location to receive the wireless service. The second communication device facilitates providing the wireless service to the first communication device, whenever the first communication device is located in the space.

According to a third aspect of embodiments herein, the object is achieved by the first communication device configured to operate in the wireless communications network. The first communication device is further configured to receive, via the interface of the first communication device, the first indication. The first indication is from the user of the first communication device. The first indication is configured to explicitly indicate the desired location to receive the wireless service. The first communication device is further configured to provide, based on the first indication configured to be received, the second indication to the second communication device. The second communication device is configured to operate in the wireless communications network. The second indication is configured to indicate that the space corresponding to the desired location configured to be indicated, is the desired space to receive the wireless service from the wireless communications network. The first communication device is further configured to initiate obtaining the wireless service from the second communication device whenever the first communication device is located in the space.

According to a fourth aspect of embodiments herein, the object is achieved by the second communication device. The second communication device is configured to operate in the wireless communications network. The second communication device is further configured to receive the second indication from the first communication device configured to operate in the wireless communications network. The second indication is configured to indicate that the space is the desired space to receive the wireless service from the wireless communications network. The space corresponds to the location configured to be explicitly indicated by the user of the first communication device, as the desired location to receive the wireless service. The second communication device is further configured to facilitate providing the wireless service to the first communication device, whenever the first communication device is located in the space.

According to a fifth aspect of embodiments herein, the object is achieved by a computer program. The computer program comprises instructions which, when executed on at least one processor, cause the at least one processor to carry out the method performed by the first communication device.

According to a sixth aspect of embodiments herein, the object is achieved by computer-readable storage medium. The computer-readable storage medium has stored thereon a computer program comprising instructions which, when executed on at least one processor, cause the at least one processor to carry out the method performed by the first communication device.

According to a seventh aspect of embodiments herein, the object is achieved by a computer program. The computer program comprises instructions which, when executed on at least one processor, cause the at least one processor to carry out the method performed by the third communication device.

According to an eighth aspect of embodiments herein, the object is achieved by computer-readable storage medium. The computer-readable storage medium has stored thereon a computer program comprising instructions which, when executed on at least one processor, cause the at least one processor to carry out the method performed by the third communication device.

By the first communication device receiving the first indication indicating the desired location to receive the wireless service, the first communication device is enabled to then indicate that the space corresponding to the desired location is the desired space to receive the wireless service, and subsequently initiate obtaining the wireless service whenever the first communication device is located in the space. By enabling to provide the wireless service to particular locations, such as a home, wherein there may be only a user, or wherein the number of users may be reduced, the load of the wireless communications network is managed and distributed geographically. This in turn results in the usage of the general resources of the wireless communications network in common locations is to be decreased, allowing the wireless communications network to have more capacity at all times to provide communication services to all users, decreasing also the latency of the system.

BRIEF DESCRIPTION OF THE DRAWINGS

Examples of embodiments herein are described in more detail with reference to the accompanying drawings, and according to the following description.

DETAILED DESCRIPTION

Figure 1:
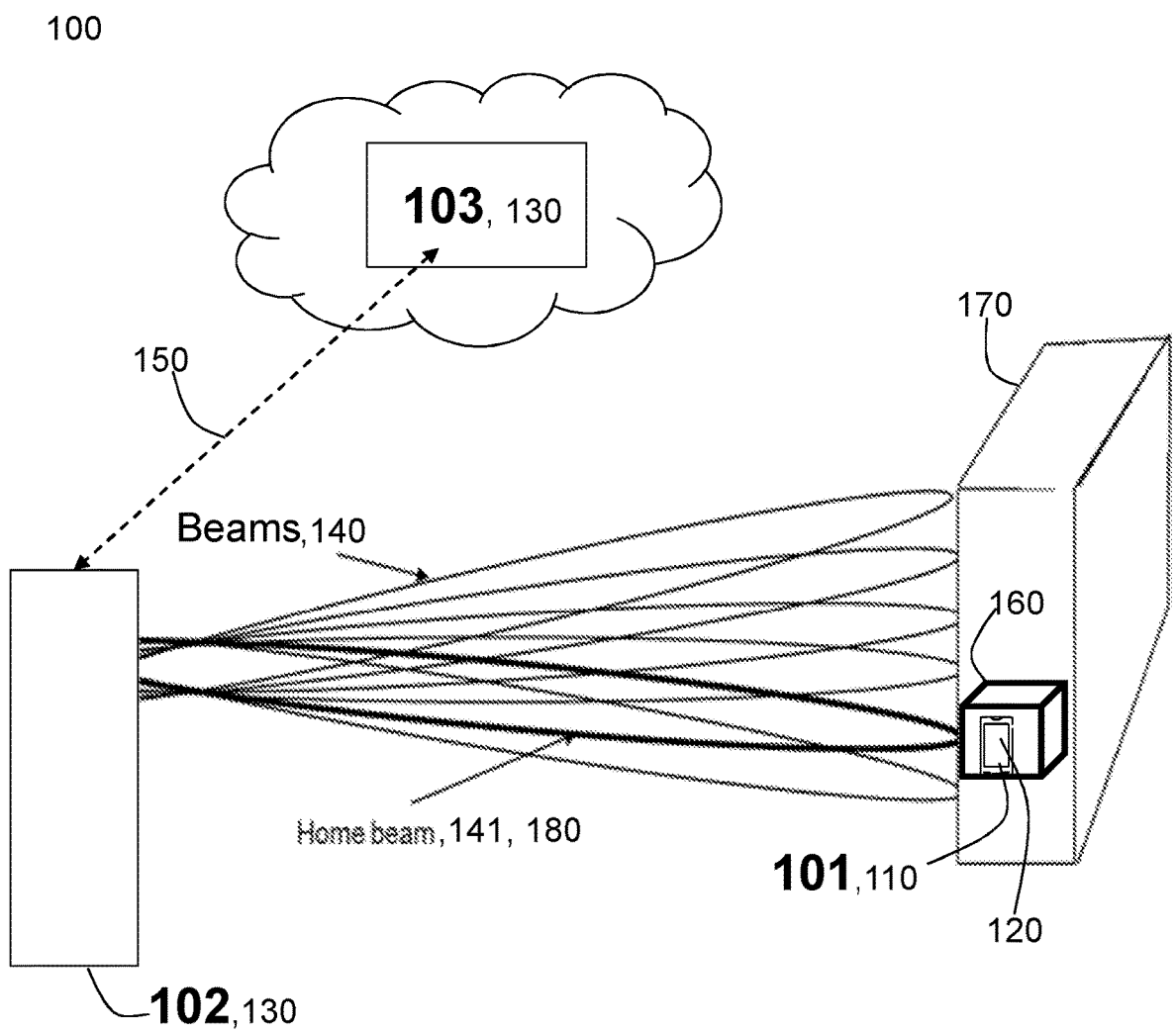
FIG. 1 is a schematic diagram illustrating a wireless communications network according to some embodiments.

As part of the development of the embodiments disclosed herein, a problem associated with existing methods will first be identified and discussed.

As mentioned earlier, gigabit over-the-air mobile systems may most likely emerge with the advent of 5G technology. To avoid that a high load in certain areas with a concentration of users affects the performance of the network by decreasing its capacity and increasing its latency, a managed distribution of the load by the network may be beneficial. According to existing methods, fixed to-the-home systems, such as "wireless fiber" systems, may be provide certain wireless services such as e.g., unlimited access to TV-like streamed high definition content. According to existing methods certain groups, so called "Closed subscription groups", in indoor Distributed Antenna Systems (DAS), which may identified by their SIM cards, may be offered certain wireless services, such as free voice inside the building, or "unlimited data". Such methods may encourage users of the groups to use the network in such indoor spaces, to prevent unnecessary charges for the usage of the network.

However, in-building system solutions do not apply in today's envisioned 5G outdoor-to-indoor data delivery systems, which therefore leave the problems expected to be created by overuse of resources in areas with a high number of users unresolved.

Embodiments herein address the above mentioned shortcomings. Embodiments herein may be understood to relate to utilizing massive MIMO systems to pinpoint spaces wherein a wireless device may be offered to a user. Massive MIMO systems may be characterized by holding many and narrow antenna beams. In such systems, each beam may cover a rather small physical area. Beam angular coverage combined with some timing advance measurements may define a rather limited "box" or volume in space. Such limited box in space may represent a user's home area, to which the network may support or provide a certain wireless service. Therefore, a user may be encouraged to obtain the wireless service in the designated box in space, e.g., a home space, which in turn results in a distribution of the load, so that the capacity and latency of the network may not be negatively affected in areas with high concentration of users.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

Any reference herein to the terms "first", "second" or "third" will be understood to refer a manner of distinguishing between different instances of the terms they may modify. "First", "second", or "third" are not intended to confer a cumulative or chronological meaning to the terms they modify.

FIG. 1 depicts a non-limiting example of a wireless communications network 100, sometimes also referred to as a radio system, radio network or wireless communications system, in which embodiments herein may be implemented. The wireless communications network 100 may be a network using beamforming. In particular embodiments, the wireless communications network 100 may be a massive MIMO system. The wireless communications network 100 may for example be a Long-Term Evolution (LTE) network, such as an LTE Time Division Duplex (TDD) network, an LTE Frequency Division Duplex (FDD) network, or an LTE operating in an unlicensed band, or a 5G system, a Code Division Multiple Access (CDMA), Wideband Code Division Multiple Access (WCDMA), Universal Terrestrial Radio Access (UTRA) TDD, Ultra-Mobile Broadband (UMB), Global System for Mobile communications (GSM) network, GSM/Enhanced Data Rate for GSM Evolution (EDGE) Radio Access Network (GERAN) network, EDGE network, a network comprising of any combination of Radio Access Technologies (RATs) such as e.g. Multi-Standard Radio (MSR) base stations, multi-RAT base stations etc., any 3rd Generation Partnership Project (3GPP) network, WiFi network, Worldwide Interoperability for Microwave Access (WiMax), or any wireless network or system. Thus, although terminology from LTE may be used in this disclosure to exemplify embodiments herein, this should not be seen as limiting the scope of the embodiments herein to only the aforementioned system. Other wireless systems may also benefit from exploiting the ideas covered within this disclosure.

The wireless communications network 100 comprises a plurality of communication devices whereof a first communication device 101, a second communication device 102, and a third communication device 103 are depicted in FIG. 1. The first communication device 101 is a radio network node, such as a wireless device 110, as described below. The second communication device 102 is a network node, such as the network node 130 described below. The second communication device 102 may typically be a transmission point with beamforming capability serving the first communication device 101, as depicted in FIG. 1. The third communication device 103 is a network node controlling the actions of the second communication device 102.

The second communication device 102 may also be implemented in a distributed fashion, wherein the actions described herein as being performed by the second communication device 102 may actually be performed by one or more processors from different nodes communicating in the cloud. In some non-limiting examples, such as that depicted in the non-limiting example of FIG. 1, the third communication device 103 and the second communication device 102 may be implemented in a so-called cloud solution, where the third communication device 103 may be a so-called virtual node or virtual machine controlling the actions of the second communication device 102. In other examples, the third communication device 103 may be, e.g., a core network node, such as, e.g., Mobility Management Entity (MME), Self-Optimizing/Organizing Network (SON) node, a coordinating node, positioning node, Minimization of Drive Test (MDT) node, etc. In yet other embodiments, which are not depicted in FIG. 1, the third communication device 103 may be the same as the second communication device 102, in which case the third communication device 103 and the second communication device 102 may be a same network node.

A number of wireless devices may be located in the wireless communications network 100. In the example scenario of FIG. 1, a wireless device 110 is shown. The wireless device 110, such as a UE, may be also known as e.g. mobile terminal, wireless terminal and/or mobile station, mobile telephone, cellular telephone, or laptop with wireless capability, or a Customer Premises Equipment (CPE), just to mention some further examples. The wireless device in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, CPE or any other radio network unit capable of communicating over a radio link in the wireless communications network 100. The wireless device may be wireless, i.e., it may be enabled to communicate wirelessly in the wireless communication network 100. The communication may be performed e.g., between two devices, between a device and a network node, and/or between a device and a server. The communication may be performed e.g., via a RAN and possibly one or more core networks, comprised within the wireless communications network 100.

The first wireless device 101 comprises an interface 120. The interface 120 may facilitate communications between the first wireless device 101 and the user. The interface 120 may be, e.g., a screen, where a user may provide and receive input, a loudspeaker, or a case. For example, the interface 120 may be a human-machine interface enabled to provide or receive visual, audio or tactile input.

The wireless communications network 100 comprises a plurality of network nodes whereof two examples of a network node 130 are depicted in FIG. 1. In some embodiments, the radio network node 130 may be Transmission Point, such as e.g., a base station, an eNB, eNodeB, or a Home Node B, a Home eNodeB, femto Base Station, BS, Radio Access Point, Remote Radio Unit (RRU), Remote Radio Head (RRH), or any other network unit capable to serve a wireless device or a machine type communication device in the wireless communications network 100 using beamforming. In such embodiments, the network node 130 may be e.g., a Wide Area Base Station, Medium Range Base Station, Local Area Base Station and Home Base Station, based on transmission power and thereby also coverage size. The network node 130 may be a stationary relay node or a mobile relay node. The network node 130 may support one or several communication technologies, and its name may depend on the technology and terminology used. The network node 130 may serve receiving nodes such as the first communication device 101, with serving beam-formed beams, which may also be referred to herein simply as beams. In some embodiments, the network node 130 may correspond to any type of radio network node or any network node, which communicates with at least a radio network node.

In 3GPP LTE, any of the third communication device 103 and the second communication device 102 may be directly connected to one or more networks.

The first communication device 101 may communicate with the second communication device 102 over a first link, e.g., a radio link. In some embodiments wherein the second communication device 102 may be a transmission point, such as that depicted in FIG. 1, transmitting a plurality of transmitted beam-formed beams 140, the link between the first communication device 101 and the second communication device 102 may comprise a first set of one or more beam-formed beams 141 from the plurality of transmitted beam-formed beams 140. The second communication device 102 may communicate with the third communication device 103 over a second link 150, which may be a radio link, and may be a direct link, or may comprise a plurality of links.

The first communication device 101 may be located in a space 160, corresponding to for example, the home of the user of the first communication device 101. The space may be, e.g., in a building 170. The space 160 may typically be three-dimensional. Whenever the first communication device 101 may be located in the space 160, it may be served by one or more beam-formed beams 180, which may comprise at least one beam-formed beam of the first set of one or more beam-formed beams 141, which may also be referred to as a "home beam". In the space 160, the one or more beam-formed beams 180 may also comprise beam-formed beams from one or more other TPs, although this is not depicted in FIG. 1 to simplify the figure.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 2:
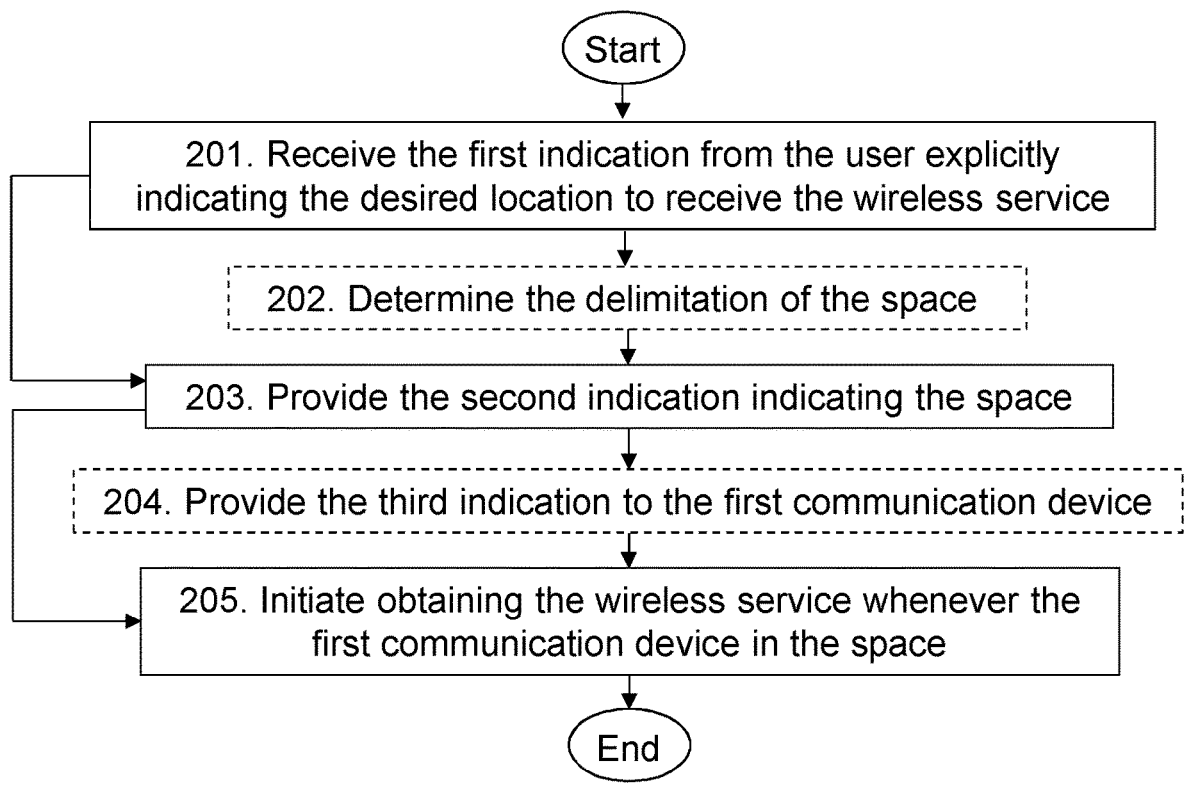
FIG. 2 is a schematic flowchart illustrating a non-limiting example of a method in a first communication device, according to some embodiments.

Embodiments of a method performed by the first communication device 101 operating in the wireless communications network 100, will now be described with reference to the flowchart depicted in FIG. 2.

The method may comprise some of the following actions. In some embodiments all the actions may be performed. One or more embodiments may be combined, where applicable. All possible combinations are not described to simplify the description. In FIG. 2, optional actions are indicated by dashed boxes.

Action 201

To delimit the "box" in space mentioned earlier where an operator may provide a certain wireless service or special offer, such as e.g., "unlimited amount data when at home", fiber replacement, "limited/unlimited" throughput, unlimited for speech calls, a certain bit rate, etc. to a user of the first communication device 101, the user may first be given to opportunity to select a location where the user would prefer to receive the wireless service. For example, a user may desire to receive the wireless service at home, where the user knows that he or she typically performs most of the downloading of large media contents, such as streaming of video. In order to provide the opportunity to the user to indicate the desired location to receive the wireless service, the first communication device 101 may provide a request for input from the user, that is a request for a first indication explicitly indicating a desired location to receive the wireless service. The indication of the desired location in the first indication is explicit. For example, the location may be the home of the user. The first indication may be a selection of a list of addresses associated with the user, such as a billing address, a delivery address, or a request to type an address or click on a location on a map, etc. According to this, in this Action 201, the first communication device 101, receives, via an interface 120 of the first communication device 101, the first indication from the user of the first communication device 101, the first indication explicitly indicating a desired location to receive the wireless service. As mentioned earlier, the interface 120 may be a screen, microphone, button, or mouse of the first communication device 101, which may be, e.g., a smartphone, desktop, or tablet of the user. The first indication may be for example, a tap on a touch screen, e.g., to select an on-screen icon for a billing address associated with the user, or a click on a mouse, a voice signal provided on a microphone, or a movement of the first communication device 101, such as shaking a telephone in a predefined or selected way. The first indication may also be an SMS, or an accession to a web page, etc. Receiving the first indication may therefore comprise, in some examples, receiving more than one first indication, as in some examples, the user may also indicate the desired location, e.g., its "home area" by, for example, a certain sequence, or calibration process, by for example, sending a plurality of first indications in different geographical points on the desired location.

Action 202

Once the first communication device 101 knows the desired location of the user to receive the wireless service, the first communication device 101 may, in this Action 202, determine a delimitation of a space 160 corresponding to the indicated desired location. The space 160 may be understood as the "box" in space mentioned earlier, in other words, a volume in space, that from the perspective of the wireless communications network 100, may correspond to the desired location by the user, e.g., the address, received from the user in Action 201. The location may be understood as a variable as known by the user, whereas the space 160 may be understood as a variable understood by the wireless communications network 100. That is, the space 160 may be understood as a volume wherein the wireless service may be provided by the wireless communications network 100 to the user of the first communication device 101. In the space 160, the wireless device may be provided to other communication devices in the space 160, according to e.g., an agreement between the user and an operator the wireless communications network 100. The space 160 may correspond to the desired space by the user of the first communication device 101 to receive the wireless service from the wireless communications network 100. Determining may be understood herein as autonomously calculating, or receiving from another communication device in the wireless communications network 100, e.g., the second communication device 102.

The determining, in this Action 202, of the delimitation may be based on the received first indication. For example, upon receipt of the first indication, the first communication device 101 may tag what specific beam, and at which transmission point or transmission points, the user may be served by, so that a specific wireless service may be bound to the space 160 corresponding that "location". This may be performed, for example, during the calibration process mentioned earlier. The delimitation of the space 160 may depend on the associated location, as indicated in Action 201, e.g., whether the indicated desired location is a studio apartment, or a three-story house, etc.

The space 160 may be at least one of: a geographical space and a radio coverage area. Therefore, the determining of the delimitation in this Action 202 may be based on e.g., GPS measurements for a delimitation of the geographical space, radio signalling information for a delimitation of the radio coverage area, or a combination of both.

Embodiments herein may take advantage of the fact that massive MIMO systems may hold many and narrow antenna beams, and that each beam may therefore cover a rather small physical area. Beam angular coverage combined with some timing advance measurements may define a rather limited "box" in space. Such "home area bounding box" may represent a user's home area, or other selected area, in which the operator may provide a user with the wireless service, which may be understood also as specific offers. Given the expected angular resolution of emerging massive-MIMO systems, in combination with transmission-user distances in the order of 100 meters, or less, sufficient "spatial resolution" may become available.

In embodiments wherein the space 160 may be at least the radio coverage area, the radio coverage area may be based on a coverage by the one or more beam-formed beams 180, from one or more transmission points operating in the wireless communications network 100. For example, as illustrated in the non-limiting example of FIG. 1, the space 160 is covered by a single beam-formed beam transmitted by the second communication device 102, which in this particular example is a transmission point. In other examples, the space 160 may be covered by more than one beam-formed beam transmitted by a single transmission point, or by a combination of beams from different transmission points. Also, the resolution of space 160, or bounding area or bounding box, may be improved by utilizing Timing Advance (TA) information, to improve the "radial" component of the space 160.

Accordingly, the determination of the delimitation of the space 160 may be based on at least one of: a) an identification of one or more beam-formed beams 180 serving the first communication device 101 in the indicated space 160; b) an identification of one or more transmission points serving the first communication device 101 in the indicated space 160; c) a TA measurement between the first communication device 101, when located in the indicated space 160, and a serving beam-formed beam; and d) a measure of signal strength between the first communication device 101, when located in the indicated space 160, and a serving beam-formed beam.

With regards to option c), in particular embodiments, to identify the space 160, the first communication device 101 may also be to add statistics of "distance" a beam has to travel from its respective transmitting TP to the first communication device 101, e.g., a CPE, which may be obtained from TA information. If there is more than one serving beam-formed beam, the delimitation may be based on a TA measurement for each serving beam-formed beam. Likewise, if there is more than one serving Transmission Point (TP), there may be a respective TA measurement for each TP associated to the area. It may also be possible that more than one TA is associated to the same beam due to reflections. The combination of a beam or "group of beams" may further pin down the home area, in both, the angular direction and the "radial" distance. In particular examples, per-beam utilization statistics may be used to refine identification of a proper beam covering the space 160, e.g., "home beam", in scenarios where two or more beams may be plausible candidates, to improve a performance in beam-border areas of the space 160, e.g., in the home area.

It may be noted that the TA may need to have a large range, large range of intervals, due to multipath, or multipath, propagation. A TA measurement may correspond a range of values, or to a single value. One reason for large differences in TA within "a beam" may stem from that a single beam which may normally be in the dominating path, may sometimes be blocked, and other paths or multi-paths may then become the new main paths.

Action 202 is optional, since the delimitation of the space 160 may be performed by another communication device in the wireless communications network 100, e.g., by the second communication device 102 or the third communication device 103, using similar methods as those described for this Action.

Action 203

In order for the first communication device 101 to indicate to the wireless communications network 100 the area 160 where the user desires to receive the wireless service, in this Action 203, the first communication device 101 provides, based on the received first indication, a second indication to the second communication device 102 operating in the wireless communications network 100. The second indication indicates that the space 160 corresponding to the indicated desired location, is a desired space to receive the wireless service from the wireless communications network 100. Providing may be understood here as sending, e.g., via the one or more beam-formed beams 180 serving the space 160, which may also be referred to as the "home beam". An indication may be understood herein as e.g., a signal or a message. In this case, the second indication may typically be a radio signal, but it may also be another type of signal.

That the second indication is based on the first indication may be understood to mean that the space 160 corresponds to the desired location, as indicated by the user. This may be understood as being due to the user not knowing the space 160, as the wireless communications network 100 may assign to the desired location, which is known to the user. In other words, the area 160 may be understood as an internal variable of the wireless communications network 100, whereas the location indicated by the user is known to the user.

In some embodiments, the second indication may comprise at least one of: a) the identification of one or more beam-formed beams 180 serving the first communication device 101 in the indicated space 160; b) the identification of one or more transmission points serving the first communication device 101 in the indicated space 160; c) the TA measurement between the first communication device 101, when located in the indicated space 160, and a serving beam-formed beam; and d) the measure of signal strength between the first communication device 101, when located in the indicated space 160, and a serving beam-formed beam.

In the embodiments wherein the first communication device 101 may have determined the delimitation of the space 160 according to Action 202, the second indication may be based on the determined delimitation. Alternatively, the second indication may comprise a logic reference to the space 160, independently of a particular delimitation of the space 160, that the second communication device 102 may then process to itself determine the delimitation of the space 160. In a particular case, the second indication may indicate to the second communication device 102 the information received from the user in Action 201, without adding any further information. Nevertheless, the second indication, in any of these examples may enable the second communication device 102 to facilitate providing 304 the wireless service to the first communication device 101, whenever the first communication device 101 may be located in the space 160.

In the embodiments wherein the first communication device 101 may not have performed Action 202 and determined the delimitation of the space 160, a) the identification of one or more beam-formed beams 180 serving the first communication device 101 in the indicated space 160; b) the identification of one or more transmission points serving the first communication device 101 in the indicated space 160; c) the TA measurement between the first communication device 101, when located in the indicated space 160, and a serving beam-formed beam; and d) the measure of signal strength between the first communication device 101, when located in the indicated space 160, and a serving beam-formed beam.

Action 204

Once the space 160 may have been delimited by either the first communication device 101 in Action 202, or by the second communication device 102, so that the delimitation of the space 160 is known, the first communication device 101 may be able to detect when the first communication device 101 is in the space 160, e.g., when the user is home. The first communication device 101 may be able to detect when it is in the space 160 by receiving a notification or indication from the second communication device 102 informing the first communication device 101 it is in the space 160. Alternatively, the first communication device 101 may itself evaluate the same criteria that may have been used to determine the delimitation of the space 160 in Action 202, such as the identification of the one or more beam-formed beams 180 serving the first communication device 101 in the indicated space 160, the identification of the one or more transmission points serving the first communication device 101 in the indicated space 160, the TA measurement between the first communication device 101, when located in the indicated space 160, and the serving beam-formed beam; and the measure of signal strength between the first communication device 101, when located in the indicated space 160, and the serving beam-formed beam. To make a user aware of being in the space, e.g., "in home area", said presence in the space 160 may be indicated by e.g., a selected on-screen icon. This may further ease a selection by a user of what wireless service or services may be useful or feasible to invoke. Typically, a Mobile Broad Band (MBB) subscription may run out of traffic volume if a user downloads streamed hi-definition video, etc.

In order to notify the user that the user is located in the space 160 where it may receive the wireless service, or even notify the user that it has left the space 160 and that another wireless service that may not be available, in this Action 204, the first communication device 101 may provide, based on whether or not the first communication device 101 is located in the space 160, a third indication via the interface 120 of the first communication device 101, the third indication indicating that at least one of: a) the first communication device 101 is located in the space 160, whenever the first communication device 101 is located in the space 160, b) the wireless service is available, whenever the first communication device 101 is located in the space 160, and c) the wireless service is unavailable, whenever the first communication device 101 is located outside the space 160. The third indication may even indicate that another wireless service is unavailable whenever the first communication device 101 is located in the space 160.

The third indication may be another type of signal than the first indication and the second indication. For example, the third indication may be a banner or a decorative icon on a screen of the first communication device 101, e.g., a smartphone, stating that the first communication device 101 is in its selected "home area", or that the wireless service is available, e.g., "unlimited data traffic is now available", or a combination of both. In another example, the third indication may be a sound signal, e.g., a beep emitted by a loudspeaker in the smartphone. Other alternatives are also possible. As one of skill in the art may understand the wireless service, may be a package of different wireless services, e.g., unlimited data traffic and a certain bit rate. Alternatively, the third indication may provide a notification to the user when he leaves the space 160 and the wireless service is no longer available.

The provision of the third indication may be performed upon an instruction from the second communication device 102, which may in some embodiments detect when the first communication device 101 is present in the space 160.

This Action 204 is optional.

Action 205

Finally, in this Action 205, the first communication device 101 may initiate obtaining 205 the wireless service from the second communication device 102, whenever the first communication device 101 is located in the space 160. That is, whenever the first communication device 101 may be detected to be in the space 160 corresponding to e.g., home, for example, by the second communication device 102, it may obtain from it the wireless service. Thanks to this Action, the user may receive the wireless service, wherever it chooses.

In the embodiments wherein the first communication device 101 may have determined the delimitation of the space 160 according to Action 202, the wireless service may be obtained whenever the first communication device 101 is located in the determined delimitation of the space 160.

Figure 3:
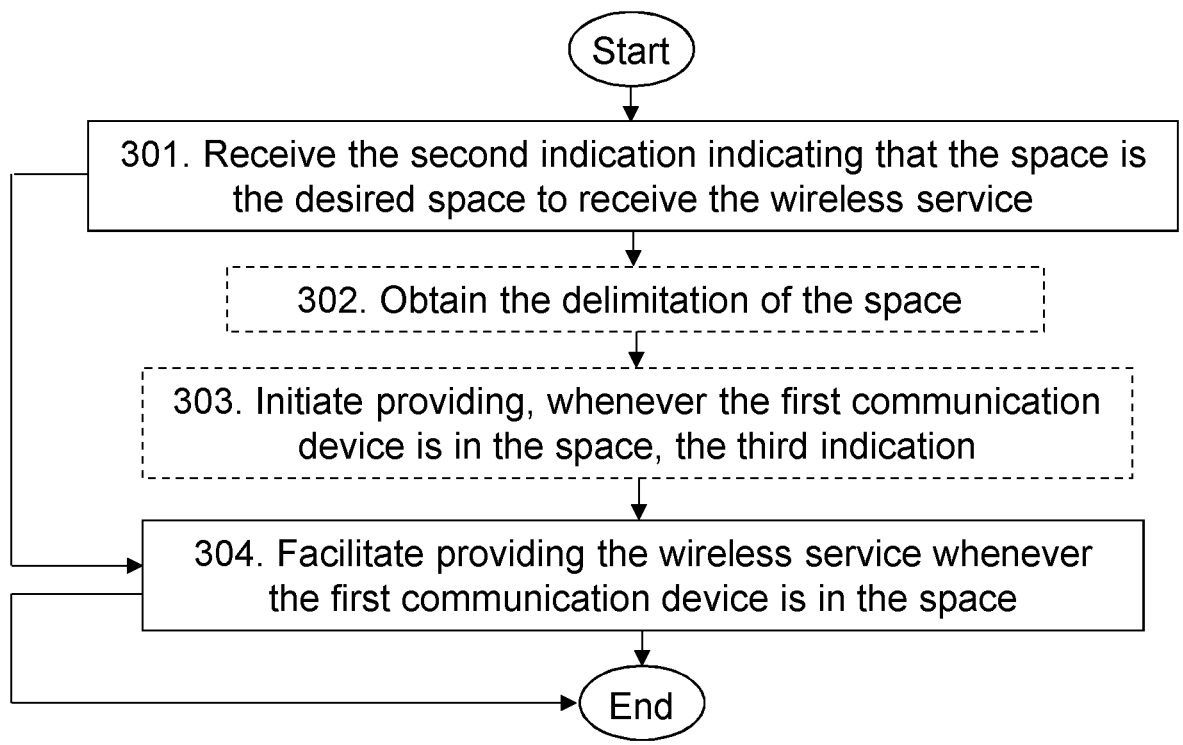
FIG. 3 is a schematic flowchart illustrating a non-limiting example of a method in a second communication device, according to some embodiments.

Embodiments of a method performed by the second communication device 102 operating in the wireless communications network 100, will now be described with reference to the flowchart depicted in FIG. 3. The second communication device 102 may be one of: a) a network node serving the first communication device 101, and b) the third communication device 103 managing a network node 130 serving the first communication device 101.

The detailed description of some of the following corresponds to the same references provided above, in relation to the actions described for the first communication device 101, and will thus not be repeated here to simplify the description. For example, the wireless service may be e.g., "unlimited amount data when at home", fiber replacement, "limited/unlimited" throughput, unlimited for speech calls, a certain bit rate, etc.

The method may comprise some of the following actions. In some embodiments all the actions may be performed. One or more embodiments may be combined, where applicable. All possible combinations are not described to simplify the description. In FIG. 3, optional actions are indicated by dashed boxes.

Action 301

In this Action 301, the second communication device 102 receives the second indication from the first communication device 101 operating in the wireless communications network 100. The second indication indicates that the space 160 is the desired space to receive the wireless service from the wireless communications network 100. The space 160 corresponds to the location explicitly indicated by the user of the first communication device 101, as the desired location to receive the wireless service.

The second communication device 102 may receive the second indication, which has already been described, via e.g., the one or more beam-formed beams 180, which may also be referred to as the "home beam". In embodiments wherein the second communication device 102 may be the third communication device 103, the second communication device 102 may receive the second indication from the first communication device 101 directly or indirectly, via other links such as e.g., the second link 150.

As described earlier, the space 160 may be at least one of: the geographical space and the radio coverage area. In some embodiments the radio coverage area may be based on the coverage by the one or more beam-formed beams 180, from one or more transmission points operating in the wireless communications network 100.

Also as described earlier, the received second indication may comprise at least one of: a) the identification of the one or more beam-formed beams 180 serving the first communication device 101 in the indicated space 160; b) the identification of the one or more transmission points serving the first communication device 101 in the indicated space 160; c) the Timing Advance measurement between the first communication device 101, when located in the indicated space 160, and a serving beam-formed beam, of the one or more beam-formed beams 180; and d) the measure of signal strength between the first communication device 101, when located in the indicated space 160, and a serving beam-formed beam, of the one or more beam-formed beams 180.

Alternatively, the received second indication may trigger the second communication device 102 to obtain at least one of: a) the identification of the one or more beam-formed beams 180 serving the first communication device 101 in the indicated space 160; b) the identification of the one or more transmission points serving the first communication device 101 in the indicated space 160; c) the Timing Advance measurement between the first communication device 101, when located in the indicated space 160, and a serving beam-formed beam, of the one or more beam-formed beams 180; and d) the measure of signal strength between the first communication device 101, when located in the indicated space 160, and a serving beam-formed beam, of the one or more beam-formed beams 180.

As discussed earlier, if the one or more beam-formed beams 180 comprise more than one serving beam-formed beam, the delimitation may be based on a TA measurement for each serving beam-formed beam.

Action 302

Once the second communication device 102 may have received the second indication it may, in this Action 302, obtain the delimitation of the space 160. The obtaining 302 of the delimitation may be based on the received second indication. Obtaining may be understood in this Action 302 as autonomously calculating, or as receiving the delimitation, as calculated by the first communication device 101, or by another communication device in the wireless communications network 100, such as the third communication device 103. In any of these alternatives, the delimitation of the space 160 may be determined as described before in Action 202.

Since the delimitation of the space 160 may be performed by another communication device in the wireless communications network 100, this Action 302 is optional.

Action 303

Once the delimitation of the space 160 may be obtained by the second communication device 120 in Action 302, the presence of the first communication device 101 in the space 160 may be detected by either the first communication device 101 or the second communication device 102. The second communication device 102 may be able to detect when the first communication device 101 is in the space 160 by evaluating the same criteria that may have been used by the first communication device 101 to determine the delimitation of the space 160 in Action 202, such as the identification of the one or more beam-formed beams 180 serving the first communication device 101 in the indicated space 160, the identification of the one or more transmission points serving the first communication device 101 in the indicated space 160, the TA measurement between the first communication device 101, when located in the indicated space 160, and the serving beam-formed beam; and the measure of signal strength between the first communication device 101, when located in the indicated space 160, and the serving beam-formed beam.

Once the presence, or absence, of the first communication device 101 in the space 160 may be detected, the second communication device 102 may, in this Action 303, initiate providing, based on whether or not the first communication device 101 is located in the space 160, the third indication via the interface 120 of the first communication device 101. As described earlier, the third indication may indicate that at least one of: a) the first communication device 101 is located in the space 160, whenever the first communication device 101 is located in the space 160; b) the wireless service is available, whenever the first communication device 101 is located in the space 160, and c) the wireless service is unavailable, whenever the first communication device 101 is located outside the space 160.

To initiate providing may be understood herein as to trigger the provision of, in this case, of the third indication. The third indication may be provided, e.g., sent by the second communication device 102 via the one or more beam-formed beams 180. In embodiments wherein the second communication device 102 may be the third communication device 103, the second communication device 102 may, according to this Action 303, instruct, directly or indirectly, via other links such as e.g., the second link 150, a TP serving the first communication device 101 to provide the third indication to the first communication device 101.

This Action 303 is optional.

Action 304

Finally, the second communication device 102, in this Action 304, facilitates providing the wireless service to the first communication device 101, whenever the first communication device 101 is located in the space 160.

To facilitate providing may be understood herein as to enable the provision of, in this case, of the wireless service, the provision of which may be first initiated elsewhere in the wireless communications network, e.g., in the third communication device 103.

In some embodiments wherein Action 302 may have been performed, the facilitating providing 304 of the wireless service to the first communication device 101 may be based on the first communication device 101 being located in the obtained delimitation of the space 160.

Figure 4:
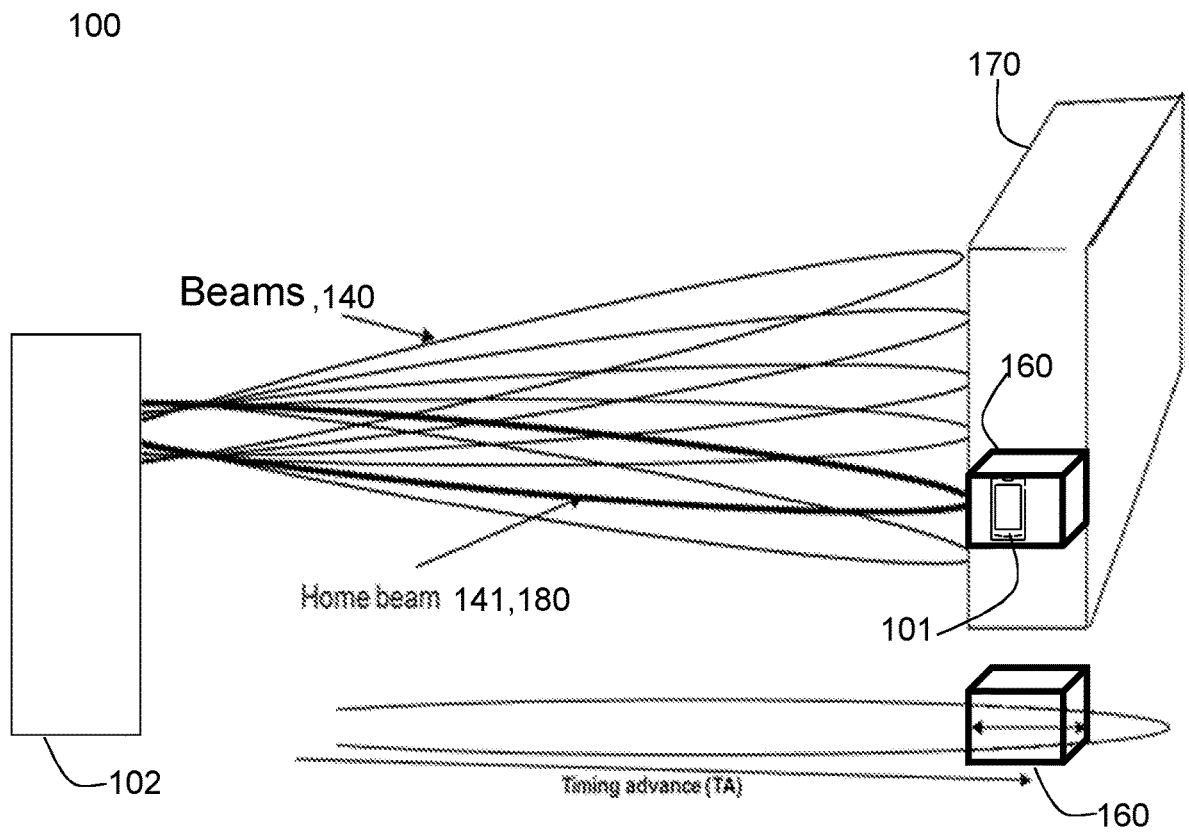
FIG. 4 is a schematic diagram illustrating aspects of a method in a first communication device and a second communication device, according to some embodiments.

FIG. 4 is a schematic diagram illustrating a non-limiting example of embodiments herein, wherein the second communication device 102 is a TP serving the first communication device 101 when it is located in the space 160. The space 160 in this Figure is a home-area bounding box given by a specific beam, the home beam of the one or more beam-formed beams 180, bounding in angular domain, serving the space 160, in conjunction with a specific Timing Advance, bounding in radial domain.

Figure 5:
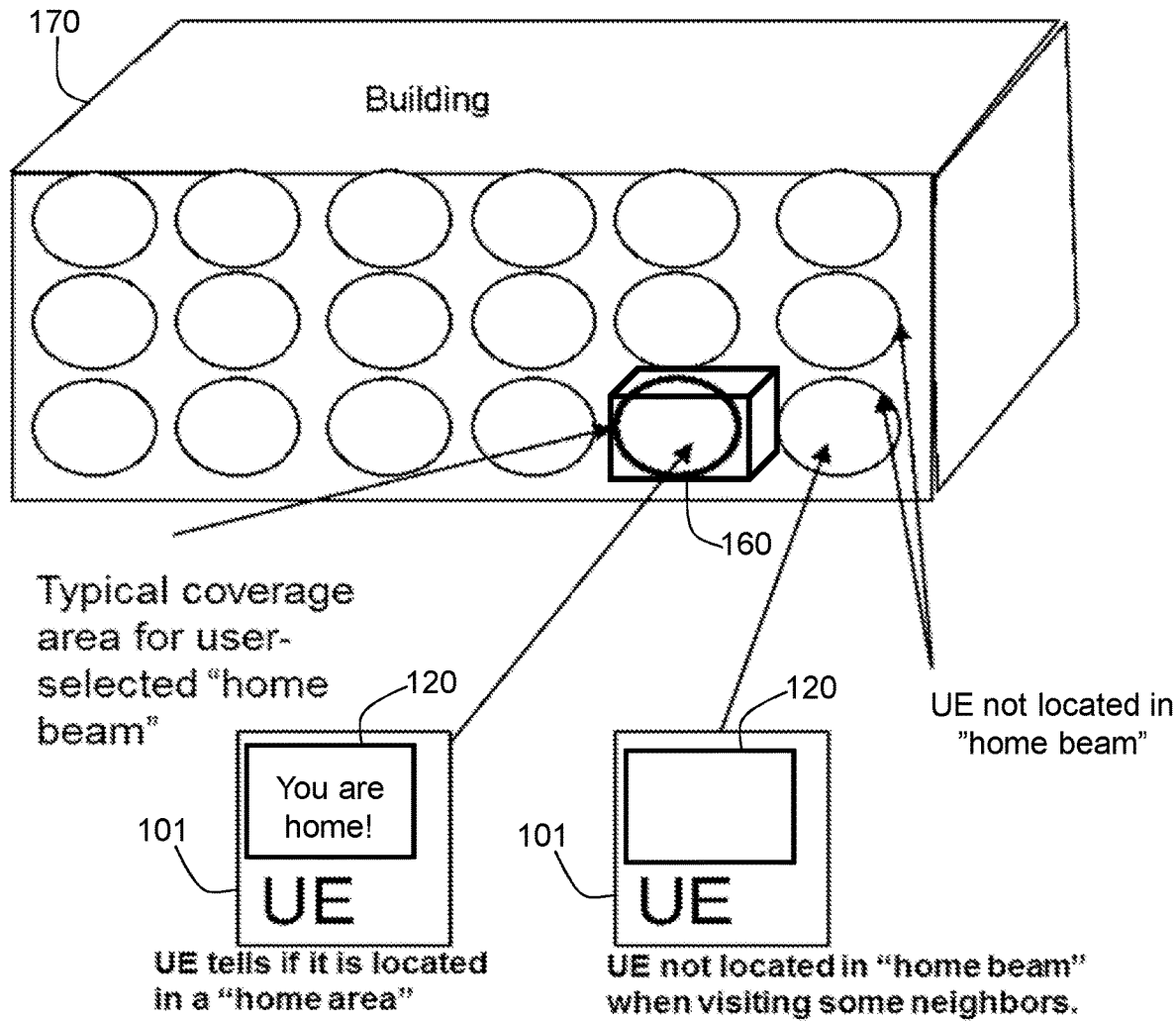
FIG. 5 is a schematic diagram illustrating aspects of a method in a first communication device, according to some embodiments.

FIG. 5 is a schematic diagram illustrating a non-limiting example of the provision of the third indication via the interface 120 of the first communication device 101, according to embodiments herein of Action 204. The first communication device 101 is in this example a UE, and the space 160 is here a Home area. "Home area presence" may be indicated to the user of the first communication device 101 by displaying a selected on-screen icon, here a "You are home!" message, on the interface 120 of the first communication device 101. Whenever the user may leave the space 160, by visiting some neighbors, represented here by empty circles in the building 170, outside of the space 160, the third indication may disappear from the interface 120.

According to the foregoing, particular embodiments herein may be understood to relate to an enablement of a beam-based home-area subscription. That is, embodiments herein may enable the possibility for an operator to provide a selected subscription to a user in a home area, or similar desired location of the user. This may be performed by the fact that a certain "beam direction", or a beam identity, pre-coder or similar, and, in some embodiments, also information of TA, may be used to pinpoint a space corresponding to a desired location of a user, e.g., a "home volume".

A benefit of the embodiments herein is that they enable to distribute the load of the wireless communications network 100. This is by enabling the provision of wireless services in locations wherein one or a few users may be located, e.g., a user's home, so that a high load may not affect the overall capacity and latency of the wireless communications network 100. This is at least in comparison to a scenario where a high number of users may request usage of resources in a same cell, which may saturate the capacity of the network, and increase its latency.

To perform the method actions described above in relation to FIG. 2, the first communication device 101 is configured to operate in the wireless communications network 100. The first communication device 101 comprises the following arrangement depicted in FIG. 6.

The detailed description of some of the following corresponds to the same references provided above, in relation to the actions described for the first communication device 101, and will thus not be repeated here.

The first communication device 101 is configured to, e.g., by means of a receiving module 601 configured to, receive, via the interface 120 of the first communication device 101, the first indication from the user of the first communication device 101, the first indication being configured to explicitly indicate the desired location to receive the wireless service. The receiving module 601 may be a processor 605 of the first communication device 101.

The first communication device 101 is further configured to, e.g., by means of a providing module 602 configured to, provide, based on the first indication configured to be received, the second indication to the second communication device 102 configured to operate in the wireless communications network 100, the second indication being configured to indicate that the space 160 corresponding to the desired location configured to be indicated, is the desired space to receive the wireless service from the wireless communications network 100. The providing module 602 may be the processor 605 of the first communication device 101.

In some embodiments, the space 160 may be configured to be at least one of: the geographical space and the radio coverage area.

In some embodiments, the radio coverage area may be configured to be based on the coverage by the one or more beam-formed beams 180 from the one or more transmission points configured to operate in the wireless communications network 100.

In some embodiments, the second indication may comprise at least one of: a) the identification of the one or more beam-formed beams 180 configured to serve the first communication device 101 in the space 160 configured to be indicated; b) the identification of one or more transmission points configured to serve the first communication device 101 in the space 160 configured to be indicated; c) the TA measurement between the first communication device 101, when located in the space 160 configured to be indicated, and the serving beam-formed beam; and d) the measure of signal strength between the first communication device 101, when located in the space 160 configured to be indicated, and the serving beam-formed beam.

In other embodiments, the second indication may be further configured to trigger the second communication device 102 to obtain at least one of: a) the identification of the one or more beam-formed beams 180 configured to serve the first communication device 101 in the space 160 configured to be indicated; b) the identification of the one or more transmission points configured to serve the first communication device 101 in the space 160 configured to be indicated; c) the TA measurement between the first communication device 101, when located in the space 160 configured to be indicated, and the serving beam-formed beam; and d) the measure of signal strength between the first communication device 101, when located in the space 160 configured to be indicated, and the serving beam-formed beam.

The first communication device 101 is further configured to, e.g., by means of an initiating obtaining module 603 configured to, initiate obtaining the wireless service from the second communication device 102 whenever the first communication device 101 may be located in the space 160. The initiating obtaining module 603 may be the processor 605 of the first communication device 101.

The first communication device 101 may be further configured to, e.g., by means of a determining module 604 configured to, determine the delimitation of the space 160, wherein to determine the delimitation is configured to be based on the first indication configured to be received, wherein the second indication is configured to be based on the delimitation configured to be determined, and wherein the wireless service is configured to be obtained whenever the first communication device 101 is located in the delimitation of the space 160 configured to be determined. The determining module 604 may be the processor 605 of the first communication device 101.

The first communication device 101 may be further configured to, e.g., by means of the providing module 602 configured to, provide, based on whether or not the first communication device 101 is located in the space 160, the third indication via the interface 120 of the first communication device 101, the third indication being configured to indicate that at least one of: a) the first communication device 101 is located in the space 160, whenever the first communication device 101 is located in the space 160, b) the wireless service is available, whenever the first communication device 101 is located in the space 160, and c) the wireless service is unavailable, whenever the first communication device 101 is located outside the space 160. The providing module 602 may be the processor 605 of the first communication device 101.

Figure 6:
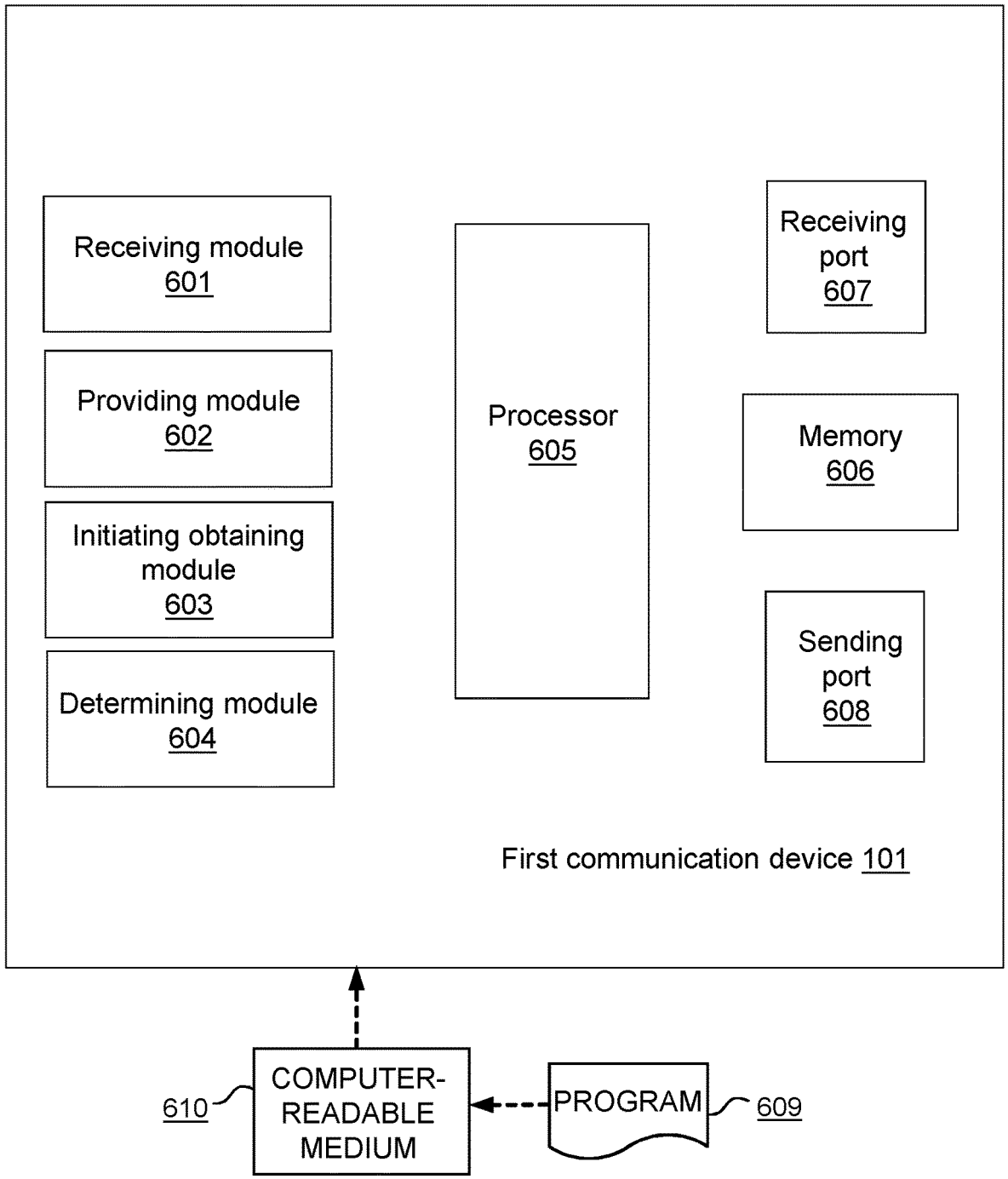
FIG. 6 is a block diagram illustrating embodiments of a first communication device, according to some embodiments.

The embodiments herein as performed by the first communication device 101 may be implemented through one or more processors, such as the processor 605 in the first communication device 101 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the in the first communication device 101. One such carrier may be in the form of a CD ROM disc. It is however feasible with other data carriers such as a memory stick. The computer program code may furthermore be provided as pure program code on a server and downloaded to the first communication device

101. The computer program code may also be provided as a service from the cloud. As indicated above, the processor 605 may comprise one or more circuits, which may also be referred to as one or more modules in some embodiments, each configured to perform the actions carried out by the first communication device 101, as described above in reference to FIG. 6, e.g., the receiving module 601, the providing module 602, the initiating obtaining module 603, and the determining module 604. Also, in some embodiments, the receiving module 601, the providing module 602, the initiating obtaining module 603, and the determining module 604 described above may be implemented as one or more applications running on one or more processors such as the processor 605.

The first communication device 101 may further comprise a memory 606 comprising one or more memory units. The memory 606 may be arranged to be used to store obtained information, such as the information received by the processor 605, store data configurations, scheduling, and applications etc. to perform the methods herein when being executed in the first communication device 101. The memory 606 may be in communication with the processor 605. Any of the other information processed by the processor 605 may also be stored in the memory 606.

In some embodiments, information e.g., from the second communication device 102, the user, or the third communication device 203, may be received through a receiving port 607. The receiving port 607 may be in communication with the processor 605. The receiving port 607 may also be configured to receive other information.

The processor 605 may be further configured to send messages, e.g., to the user, to the second communication device 102 or the third communication device 203, through a sending port 608, which may be in communication with the processor 605, and the memory 606.

Those skilled in the art will also appreciate that the any module of the first communication device 101, e.g., the receiving module 601, the providing module 602, the initiating obtaining module 603, and the determining module 604 described above, may refer to a combination of analog and digital circuits, and/or one or more processors such as the processor 605 configured with software and/or firmware, e.g. stored in the memory 606, that when executed by the one or more processors such as the processor 605, perform actions as described above, in relation to FIG. 2. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Pursuant to the foregoing, the methods according to the embodiments described herein for the first communication device 101 may be respectively implemented by means of a computer program 609 product, comprising instructions, i.e., software code portions, which, when executed on at least one processor 605, cause the at least one processor 605 to carry out the actions described herein, as performed by the first communication device 101. The computer program 609 product may be stored on a computer-readable storage medium 610. The computer-readable storage medium 610, having stored thereon the computer program 609, may comprise instructions which, when executed on at least one processor 605, cause the at least one processor 605 to carry out the actions described herein, as performed by the first communication device 101. In some embodiments, the computer-readable storage medium 610 may be a non-transitory computer-readable storage medium, such as a CD ROM disc, a memory stick, or stored in the cloud space. In other embodiments, the computer program 609 product may be stored on a carrier containing the computer program, wherein the carrier is one of an electronic signal, optical signal, radio signal, or the computer-readable storage medium 610, as described above.

To perform the method actions described above in relation to FIG. 2, the second communication device 102 is configured to operate in the wireless communications network 100. The second communication device 102 comprises the following arrangement depicted in FIG. 7.

The detailed description of some of the following corresponds to the same references provided above, in relation to the actions described for the second communication device 102, and will thus not be repeated here.

The second communication device 102 is configured to, e.g., by means of a receiving module 701 configured to, receive the second indication from the first communication device 101 configured to operate in the wireless communications network 100, the second indication being configured to indicate that the space 160 is the desired space to receive the wireless service from the wireless communications network 100, the space 160 corresponding to the location configured to be explicitly indicated by the user of the first communication device 101, as the desired location to receive the wireless service. The receiving module 701 may be a processor 705 of the second communication device 102.

The second communication device 102 is further configured to, e.g., by means of a facilitating providing module 702 configured to, facilitate providing the wireless service to the first communication device 101, whenever the first communication device 101 is located in the space 160. The facilitating providing module 702 may be the processor 705 of the second communication device 102.

In some embodiments, the space 160 may be configured to be at least one of: the geographical space and the radio coverage area.

In some embodiments, the radio coverage area may be configured to be based on the coverage by the one or more beam-formed beams 180 from the one or more transmission points configured to operate in the wireless communications network 100.

In some embodiments, the second indication configured to be received may comprise at least one of: a) the identification of the one or more beam-formed beams 180 configured to serve the first communication device 101 in the space 160 configured to be indicated; b) the identification of the one or more transmission points configured to serve the first communication device 101 in the space 160 configured to be indicated; c) the TA measurement between the first communication device 101, when located in the space 160 configured to be indicated, and the serving beam-formed beam; and d) the measure of signal strength between the first communication device 101, when located in the space 160 configured to be indicated, and the serving beam-formed beam.

In other embodiments, the second indication configured to be received may be further configured to trigger the second communication device 102 to obtain at least one of: a) the identification of the one or more beam-formed beams 180 configured to serve the first communication device 101 in the space 160 configured to be indicated; b) the identification of the one or more transmission points configured to serve the first communication device 101 in the space 160 configured to be indicated; c) the TA measurement between the first communication device 101, when located in the space 160 configured to be indicated, and the serving beam-formed beam; and d) the measure of signal strength between the first communication device 101, when located in the space 160 configured to be indicated, and the serving beam-formed beam.

The second communication device 102 may be further configured to, e.g., by means of an obtaining module 703 configured to, obtain the delimitation of the space 160, wherein to obtain the delimitation may be configured to be based on the second indication configured to be received, and wherein to facilitate providing the wireless service to the first communication device 101 may be configured to be based on the first communication device 101 being located in the delimitation of the space 160 configured to be obtained. The obtaining module 703 may be the processor 705 of the second communication device 102.

The second communication device 102 may be further configured to, e.g., by means of an initiating providing module 704 configured to, initiate providing, based on whether or not the first communication device 101 is located in the space 160, the third indication via the interface 120 of the first communication device 101, the third indication being configured to indicate that at least one of: a) the first communication device 101 is located in the space 160, whenever the first communication device 101 is located in the space 160, b) the wireless service is available, whenever the first communication device 101 is located in the space 160, and c) the wireless service is unavailable, whenever the first communication device 101 is located outside the space 160. The initiating providing module 704 may be the processor 705 of the second communication device 102.

The second communication device 102 may be one of: a) the network node 130 configured to serve the first communication device 101, and b) the third communication device 103 configured to manage the network node 130 that may be configured to serve the first communication device 101.

Figure 7:
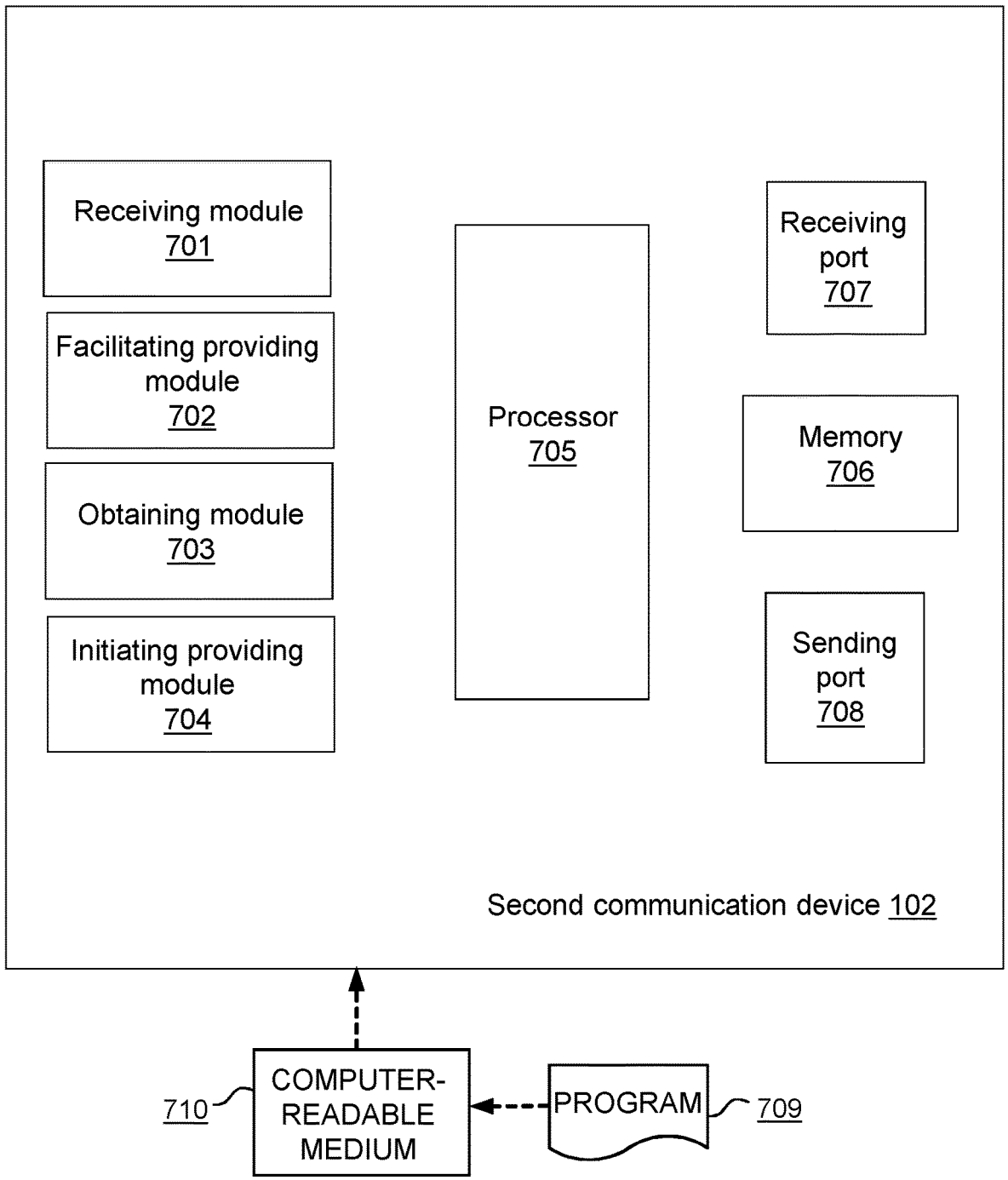
FIG. 7 is a block diagram illustrating embodiments of a second communication device, according to some embodiments.

The embodiments herein as performed by the second communication device 102 may be implemented through one or more processors, such as the processor 705 in the second communication device 102 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the in the second communication device 102. One such carrier may be in the form of a CD ROM disc. It is however feasible with other data carriers such as a memory stick. The computer program code may furthermore be provided as pure program code on a server and downloaded to the second communication device 102. The computer program code may also be provided as a service from the cloud. As indicated above, the processor 705 may comprise one or more circuits, which may also be referred to as one or more modules in some embodiments, each configured to perform the actions carried out by the second communication device 102, as described above in reference to FIG. 7, e.g., the receiving module 701, the facilitating providing module 702, the obtaining module 703, and the initiating providing module 704. Also, in some embodiments, the receiving module 701, the facilitating providing module 702, the obtaining module 703, and the initiating providing module 704 described above may be implemented as one or more applications running on one or more processors such as the processor 705.

The second communication device 102 may further comprise a memory 706 comprising one or more memory units. The memory 706 may be arranged to be used to store obtained information, such as the information received by the processor 705, store data configurations, scheduling, and applications etc. to perform the methods herein when being executed in the second communication device 102. The memory 706 may be in communication with the processor 705. Any of the other information processed by the processor 705 may also be stored in the memory 706.

In some embodiments, information e.g., from the first communication device 101, the user, or the third communication device 203, may be received through a receiving port 707. The receiving port 707 may be in communication with the processor 705. The receiving port 707 may also be configured to receive other information.

The processor 705 may be further configured to send messages, e.g., to the user, to the first communication device 101 or the third communication device 203, through a sending port 708, which may be in communication with the processor 705, and the memory 706.

Those skilled in the art will also appreciate that the any module of the second communication device 102, e.g., the receiving module 701, the facilitating providing module 702, the obtaining module 703, and the initiating providing module 704 described above, may refer to a combination of analog and digital circuits, and/or one or more processors such as the processor 705 configured with software and/or firmware, e.g. stored in the memory 706, that when executed by the one or more processors such as the processor 705, perform actions as described above, in relation to FIG. 3. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Pursuant to the foregoing, the methods according to the embodiments described herein for the second communication device 102 may be respectively implemented by means of a computer program 709 product, comprising instructions, i.e., software code portions, which, when executed on at least one processor 705, cause the at least one processor 705 to carry out the actions described herein, as performed by the second communication device 102. The computer program 709 product may be stored on a computer-readable storage medium 710. The computer-readable storage medium 710, having stored thereon the computer program 709, may comprise instructions which, when executed on at least one processor 705, cause the at least one processor 705 to carry out the actions described herein, as performed by the second communication device 102. In some embodiments, the computer-readable storage medium 710 may be a non-transitory computer-readable storage medium, such as a CD ROM disc, a memory stick, or stored in the cloud space. In other embodiments, the computer program 709 product may be stored on a carrier containing the computer program, wherein the carrier is one of an electronic signal, optical signal, radio signal, or the computer-readable storage medium 710, as described above.

According to the foregoing, some examples of embodiments herein may also comprise a carrier comprising any of the second indication and the third indication, as respectively described above, wherein the carrier is one of an electronic signal, optical signal, radio signal, or computer readable storage medium.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method performed by a first communication device operating in a wireless communications network, the wireless communications network providing a plurality of beams, the method comprising:
receiving, via an interface of the first communication device, a first indication from a user of the first communication device, the first indication explicitly indicating a desired location to receive a wireless service;
providing, based on the received first indication, a second indication to a second communication device operating in the wireless communications network, the second indication indicating that a space corresponding to the indicated desired location is a desired space to receive the wireless service from the wireless communications network; and
initiating obtaining the wireless service from the second communication device whenever the first communication device is located in the space, the wireless service using a subset of the plurality of beams corresponding to the space.

2. The method according to claim 1, wherein the space is at least one of:
a geographical space; and
a radio coverage area.

3. The method according to claim 2, wherein the radio coverage area is based on a coverage by at least one beam-formed beam of the plurality of beams from at least one transmission point operating in the wireless communications network.

4. The method according to claim 1, further comprising:
determining a delimitation of the space, the determining of the delimitation being based on the received first indication, wherein the second indication is based on the determined delimitation, and wherein the wireless service is obtained whenever the first communication device is located in the determined delimitation of the space.

5. The method according to claim 1, wherein the second indication comprises at least one of:
a. an identification of at least one beam-formed beam of the plurality of beams serving the first communication device in the indicated space;
b. an identification of at least one transmission point serving the first communication device in the indicated space;
c. a Timing Advance measurement between the first communication device, when located in the indicated space, and a serving beam-formed beam of the plurality of beams; and
d. a measure of signal strength between the first communication device, when located in the indicated space, and a serving beam-formed beam of the plurality of beams.

6. The method according to claim 1, wherein the second indication triggers the second communication device to obtain at least one of:
a. an identification of at least one beam-formed beam of the plurality of beams serving the first communication device in the indicated space;
b. an identification of at least one transmission point serving the first communication device in the indicated space;
c. a Timing Advance measurement between the first communication device, when located in the indicated space, and a serving beam-formed beam of the plurality of beams; and
d. a measure of signal strength between the first communication device, when located in the indicated space, and a serving beam-formed beam of the plurality of beams.

7. The method according to claim 1, further comprising:
providing, based on whether the first communication device is located in the space, a third indication via the interface of the first communication device, the third indication indicating that at least one of:
a. the first communication device is located in the space, whenever the first communication device is located in the space;
b. the wireless service is available, whenever the first communication device is located in the space; and
c. the wireless service is unavailable, whenever the first communication device is located outside the space.

8. A method performed by a second communication device operating in a wireless communications network, the wireless communications network providing a plurality of beams, the method comprising:
receiving a second indication from a first communication device operating in the wireless communications network, the second indication indicating that a space is a desired space to receive a wireless service from the wireless communications network, the space corresponding to a location explicitly indicated by a user of the first communication device, as a desired location to receive the wireless service; and
facilitating provision of the wireless service to the first communication device, whenever the first communication device is located in the space, the wireless service using a subset of the plurality of beams corresponding to the space.

9. The method according to claim 8, wherein the space is at least one of:
a geographical space; and
a radio coverage area.

10. The method according to claim 9, wherein the radio coverage area is based on a coverage by one or more beam-formed beams of the plurality of beams from at least one transmission point operating in the wireless communications network.

11. The method according to claim 8, further comprising:
obtaining a delimitation of the space, the obtaining of the delimitation being based on the received second indication, and wherein the facilitating the provision of the wireless service to the first communication device is based on the first communication device being located in the obtained delimitation of the space.

12. The method according to claim 8, further comprising:
initiating provision, based on whether the first communication device is located in the space, of a third indication via an interface of the first communication device, the third indication indicating that at least one of:
a. the first communication device is located in the space, whenever the first communication device is located in the space;
b. the wireless service is available, whenever the first communication device is located in the space; and c. the wireless service is unavailable, whenever the first communication device is located outside the space.

13. The method according to claim 8, wherein the received second indication comprises at least one of:
   a. an identification of one or more beam-formed beams of the plurality of beams serving the first communication device in the indicated space;
   b. an identification of one or more transmission points serving the first communication device in the indicated space;
   c. a Timing Advance measurement between the first communication device, when located in the indicated space, and a serving beam-formed beam of the plurality of beams; and
   d. a measure of signal strength between the first communication device, when located in the indicated space, and a serving beam-formed beam of the plurality of beams.

14. The method according to claim 8, wherein the received second indication triggers the second communication device to obtain at least one of:
   a. an identification of at least one beam-formed beam of the plurality of beams serving the first communication device in the indicated space;
   b. an identification of one or more transmission points serving the first communication device in the indicated space;
   c. a Timing Advance measurement between the first communication device, when located in the indicated space, and a serving beam-formed beam of the plurality of beams; and
   d. a measure of signal strength between the first communication device, when located in the indicated space, and a serving beam-formed beam of the plurality of beams.

15. The method according to claim 8, wherein the second communication device is one of:
   a network node serving the first communication device; and
   a third communication device managing a network node serving the first communication device.

16. A first communication device configured to operate in a wireless communications network, the wireless communications network providing a plurality of beams, the first communication device being further configured to:
   receive, via an interface of the first communication device, a first indication from a user of the first communication device, the first indication being configured to explicitly indicate a desired location to receive a wireless service;
   provide, based on the first indication configured to be received, a second indication to a second communication device configured to operate in the wireless communications network, the second indication being configured to indicate that a space corresponding to the desired location configured to be indicated, is a desired space to receive the wireless service from the wireless communications network; and
   initiate obtaining the wireless service from the second communication device whenever the first communication device is located in the space, the wireless service using a subset of the plurality of beams corresponding to the space.

17. The first communication device according to claim 16, wherein the space is configured to be at least one of:
   a geographical space; and
   a radio coverage area.

18. The first communication device according to claim 17, wherein the radio coverage area is configured to be based on a coverage by at least one beam-formed beam of the plurality of beams from at least one transmission point configured to operate in the wireless communications network.

19. The first communication device according to claim 15, being further configured to:
   determine a delimitation of the space, wherein the determination of the delimitation is configured to be based on the first indication configured to be received, wherein the second indication is configured to be based on the delimitation configured to be determined, and wherein the wireless service is configured to be obtained whenever the first communication device is located in the delimitation of the space configured to be determined.

20. The first communication device according to claim 16, wherein the second indication comprises at least one of:
   a. an identification of at least one beam-formed beam of the plurality of beams configured to serve the first communication device in the space configured to be indicated;
   b. an identification of at least one transmission point configured to serve the first communication device in the space configured to be indicated;
   c. a Timing Advance measurement between the first communication device, when located in the space configured to be indicated, and a serving beam-formed beam of the plurality of beams; and
   d. a measure of signal strength between the first communication device, when located in the space configured to be indicated, and a serving beam-formed beam of the plurality of beams.

21. The first communication device according to claim 16, wherein the second indication is further configured to trigger the second communication device to obtain at least one of:
   a. an identification of at least one beam-formed beam of the plurality of beams configured to serve the first communication device in the space configured to be indicated;
   b. an identification of at least one transmission point configured to serve the first communication device in the space configured to be indicated;
   c. a Timing Advance measurement between the first communication device, when located in the space configured to be indicated, and a beam-formed serving beam of the plurality of beams; and
   d. a measure of signal strength between the first communication device, when located in the space configured to be indicated, and a serving beam-formed beam of the plurality of beams.

22. The first communication device according to claim 16, being further configured to:
   provide, based on whether the first communication device is located in the space, a third indication via the interface of the first communication device, the third indication being configured to indicate that at least one of:
   a. the first communication device is located in the space, whenever the first communication device is located in the space;
   b. the wireless service is available, whenever the first communication device is located in the space; and
   c. the wireless service is unavailable, whenever the first communication device is located outside the space.

23. A second communication device configured to operate in a wireless communications network, the wireless communications network providing a plurality of beams, the second communication device being further configured to:
  receive a second indication from a first communication device configured to operate in the wireless communications network, the second indication being configured to indicate that a space is a desired space to receive a wireless service from the wireless communications network, the space corresponding to a location configured to be explicitly indicated by a user of the first communication device, as a desired location to receive the wireless service; and
  facilitate providing the wireless service to the first communication device, whenever the first communication device is located in the space, the wireless service using a subset of the plurality of beams corresponding to the space.

24. The second communication device according to claim 23, wherein the space is configured to be at least one of:
  a geographical space; and
  a radio coverage area.

25. The second communication device according to claim 24, wherein the radio coverage area is configured to be based on a coverage by at least one beam-formed beam of the plurality of beams from at least one transmission point configured to operate in the wireless communications network.

26. The second communication device according to claim 23, being further configured to:
  obtain a delimitation of the space, wherein obtaining the delimitation is configured to be based on the second indication configured to be received, and wherein facilitating the provision of wireless service to the first communication device is configured to be based on the first communication device being located in the delimitation of the space configured to be obtained.

27. The second communication device according to claim 23, being further configured to:
  initiate providing, based on whether the first communication device is located in the space, a third indication via an interface of the first communication device, the third indication being configured to indicate that at least one of:
    a. the first communication device is located in the space, whenever the first communication device is located in the space;
    b. the wireless service is available, whenever the first communication device is located in the space; and
    c. the wireless service is unavailable, whenever the first communication device is located outside the space.

28. The second communication device according to claim 23, wherein the second indication configured to be received comprises at least one of:
  a. an identification of at least one beam-formed beam of the plurality of beams configured to serve the first communication device in the space configured to be indicated;
  b. an identification of at least one transmission point configured to serve the first communication device in the space configured to be indicated;
  c. a Timing Advance measurement between the first communication device, when located in the space configured to be indicated, and a serving beam-formed beam of the plurality of beams; and
  d. a measure of signal strength between the first communication device, when located in the space configured to be indicated, and a serving beam-formed beam of the plurality of beams.

29. The second communication device according to claim 23, wherein the second indication configured to be received is further configured to trigger the second communication device to obtain at least one of:
  a. an identification of at least one beam-formed beam of the plurality of beams configured to serve the first communication device in the space configured to be indicated;
  b. an identification of at least one transmission point configured to serve the first communication device in the space configured to be indicated;
  c. a Timing Advance measurement between the first communication device, when located in the space configured to be indicated, and a serving beam-formed beam of the plurality of beams; and
  d. a measure of signal strength between the first communication device, when located in the space configured to be indicated, and a serving beam-formed beam of the plurality of beams.

30. The second communication device according to claim 23, wherein the second communication device is one of:
  a network node configured to serve the first communication device; and
  a third communication device configured to manage a network node configured to serve the first communication device.

* * * * *